United States Patent
Tanabe et al.

(10) Patent No.: US 9,302,548 B2
(45) Date of Patent: Apr. 5, 2016

(54) PNEUMATIC TIRE

(71) Applicant: SUMITOMO RUBBER INDUSTRIES, LTD., Kobe-shi, Hyogo (JP)

(72) Inventors: Maiko Tanabe, Kobe (JP); Junichiro Morozumi, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 338 days.

(21) Appl. No.: 13/962,143

(22) Filed: Aug. 8, 2013

(65) Prior Publication Data

US 2014/0137998 A1    May 22, 2014

(30) Foreign Application Priority Data

Nov. 20, 2012 (JP) ................. 2012-254517

(51) Int. Cl.
| | |
|---|---|
| *B60C 11/04* | (2006.01) |
| *B60C 11/117* | (2006.01) |
| *B60C 11/13* | (2006.01) |
| *B60C 11/03* | (2006.01) |

(52) U.S. Cl.
CPC ........... *B60C 11/0304* (2013.04); *B60C 11/032* (2013.04); *B60C 11/0309* (2013.04);
(Continued)

(58) Field of Classification Search
CPC ............ B60C 11/0304; B60C 11/0309; B60C 11/032; B60C 11/1307; B60C 11/1392; B60C 2011/0386; B60C 2011/039; B60C 2011/1338; B60C 2011/1361; B60C 11/042; B60C 11/047; B60C 11/13; B60C 11/1323; B60C 11/1353; B60C 11/1376; B60C 11/1384

USPC ............... 152/209.8–209.9, 209.21, 209.15
See application file for complete search history.

(56) References Cited

U.S. PATENT DOCUMENTS

| | | | |
|---|---|---|---|
| 2002/0053382 A1* | 5/2002 | Mori ................. | B60C 11/11 152/209.9 |
| 2011/0226398 A1* | 9/2011 | Taniguchi ........... | B60C 11/0309 152/209.21 |
| 2011/0308676 A1* | 12/2011 | Morozumi ............ | B60C 11/032 152/153 |

FOREIGN PATENT DOCUMENTS

| | | | | |
|---|---|---|---|---|
| DE | EP 0213452 | A2 * | 3/1987 | ............. B60C 11/12 |
| GB | 546975 | A * | 8/1942 | .......... B60C 11/0306 |

(Continued)

OTHER PUBLICATIONS

Machine Translation: JP 2011037315 A; Koda, Kei; no date.*

(Continued)

*Primary Examiner* — Steven D Maki
*Assistant Examiner* — Kendra Ly
(74) *Attorney, Agent, or Firm* — Birch, Stewart, Kolasch & Birch, LLP

(57) ABSTRACT

A pneumatic tire comprises an asymmetric tread pattern with a designated install direction to a vehicle having an outboard tread edges, the tread pattern having an outboard tread portion between the outboard tread edge and a tire equator and provided with an outer main groove, the outer main groove having a cross section comprising a bottom with a depth of 5.5 to 6.5 mm, and axially inner and outer groove walls each extending from the bottom to a tread contact surface, respectively, at least one of groove walls having a stepwise shape comprising a radially inner portion extending from the bottom with a height of 2.0 to 4.0 mm, an axially extending stepped portion extending from the radially inner portion with a length of 0.75 to 1.25 mm, and a radially outer portion between the stepped portion and the tread contact surface.

19 Claims, 3 Drawing Sheets

(52) U.S. Cl.
CPC ......... B60C11/1307 (2013.04); B60C 11/1323 (2013.04); B60C 11/1392 (2013.04); *B60C 11/0318* (2013.04); *B60C 11/042* (2013.04); *B60C 2011/039* (2013.04); *B60C 2011/0341* (2013.04); *B60C 2011/0348* (2013.04); *B60C 2011/0381* (2013.04); *B60C 2011/0386* (2013.04); *B60C 2011/0395* (2013.04)

(56) References Cited

FOREIGN PATENT DOCUMENTS

| JP | 05096913 | A | * | 4/1993 |
|----|----------|---|---|--------|
| JP | 2000198322 | A | * | 7/2000 |
| JP | 2007-15596 | A | | 1/2007 |
| JP | 2008-18773 | A | | 1/2008 |
| JP | 2008-195101 | A | | 8/2008 |
| JP | 2009051238 | A | * | 3/2009 |
| JP | 2009-227264 | A | | 10/2009 |
| JP | 2011-37315 | A | | 2/2011 |
| JP | 2011037315 | A | * | 2/2011 |

OTHER PUBLICATIONS

Machine Translation: JP 05096913 A; Tsukagoshi, Tetsuto; no date.*
Machine Translation: JP 2009051238 A; Yahashi, M; no date.*
Machine Translation: JP 2000198322 A; Ikeda, Yasutsugu; no date.*
Machine Translation: EP 213452; Sommer Juergen Dr-Ing; no date.*

* cited by examiner

PNEUMATIC TIRE

BACKGROUND OF THE INVENTION

1. Field of the Invention

The present invention relates to a pneumatic tire in which drainage performance, cornering stability on dry roads and straight-line stability are well-balanced improved.

2. Description of the Related Art

Japanese patent application laid-open No. 2007-15596 discloses a pneumatic tire which comprises a tread portion with a center rib having its center line in an inboard region than a tire equator. The tire also has an outboard maximum width position from its tire axis being higher than an inboard maximum width position. Due to the center rib shifted toward the inboard, the outboard region of the tread portion receives less vibration from the ground compared to the inboard region. Thus, the tire mentioned above is expected the advantage that normal ride comfort may be improved. Additionally, due to the difference between the inboard and outboard maximum width positions, the tire may improve ability of absorbing vibration from the ground.

However, the tire mentioned is liable to deteriorate drainage performance and straight-line stability.

SUMMARY OF THE INVENTION

The present invention has been worked out in light of the circumstances described above, and has a main object of providing a pneumatic tire in which drainage performance, cornering stability on dry roads and straight-line stability are well-balanced improved.

In accordance with the present invention, there is provided a pneumatic tire comprising an asymmetric tread pattern with a designated install direction to a vehicle having an inboard tread edge and an outboard tread edge, the tread pattern having an outboard tread portion that is between the outboard tread edge and a tire equator, said outboard tread portion being provided with at least one circumferentially extending outer main groove, said at least one outer main groove having a cross section which comprises a bottom having a depth in a range of from 5.5 to 6.5 mm, an axially inner groove wall which extends from the bottom to a tread contact surface, and an axially outer groove wall which extends from the bottom to the tread contact surface, at least one of said groove walls having a stepwise shape which comprises a radially inner portion extending from the bottom toward radially outwardly of the tire with a height in a range of from 2.0 to 4.0 mm, a stepped portion extending from a radially outer end of said radially inner portion in an axial direction of the tire with a length in a range of from 0.75 to 1.25 mm, and a radially outer portion extending from an axially outer end of the stepped portion to the tread contact surface.

Preferably, the axially outer groove wall has the stepwise shape.

Preferably, the radially outer portion has an arc shape which protrudes toward a groove centerline in a cross section of the outer main groove.

Preferably, the axially inner groove wall has a slant shape which smoothly extends from the bottom to the tread contact surface so as to expand the groove width.

Preferably, at least one outer main groove comprises a first outer main groove by the side of said outboard tread edge and a second outer main groove by the side of the tire equator, and each of said first and second outer main groove walls has the axially outer groove wall having said stepwise shape.

Preferably, the tread portion includes an inboard tread portion that is between the inboard tread edge and the tire equator, the inboard tread portion is provided with one circumferentially extending inner main groove to divide an inboard shoulder portion that is between the inboard tread edge and the inner main groove, the inboard shoulder portion is provided with at least one heat radiation groove having a depth in a range of from 3.0 to 5.0 mm, the heat radiation groove has a cross section comprising a radially inner part having a groove width in a range of 1.0 to 3.0 mm, and a radially outer part which comprises a pair of slant groove walls so that a groove width thereof is increasing toward the tread contact surface.

Preferably, the inboard shoulder portion is a rib continuously extending in the circumferential direction of the tire.

DETAILED DESCRIPTION

An embodiment of the present invention will be explained below with reference to the accompanying drawings.

Figure 1:
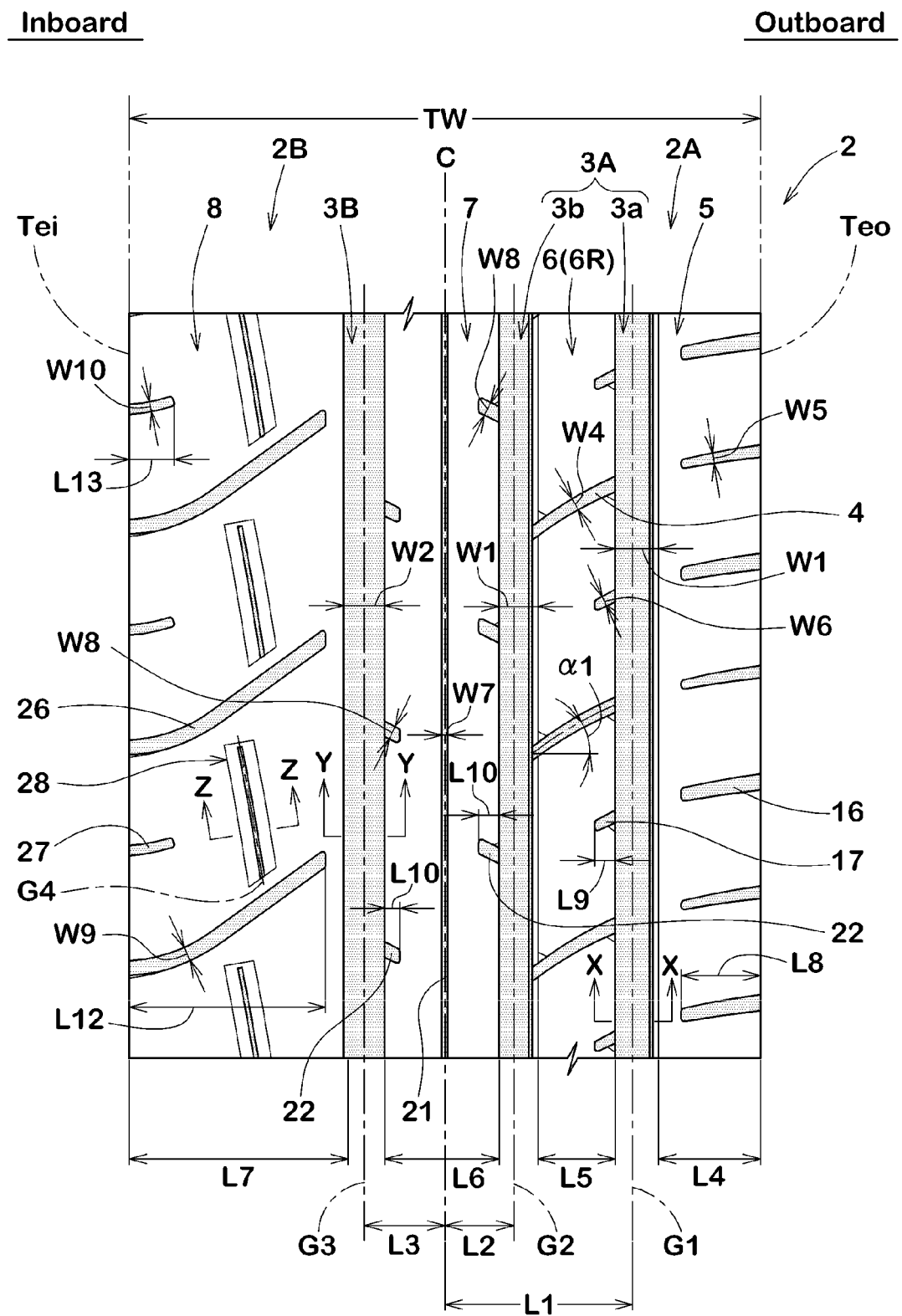
FIG. 1 is a development view of a tread portion of a pneumatic tire showing an embodiment of the present invention.

FIG. 1 shows a development view of a tread portion of a pneumatic tire showing an embodiment of the present invention. Referring to FIG. 1, the tire 1 in accordance with the present invention is illustrated as a passenger car tire which is one of the suitably embodiments. The tire 1 has an asymmetric tread pattern with a designated install direction to a vehicle having an inboard tread edge (Tei) and an outboard tread edge (Teo). The install direction of the tire is identified on its sidewall portion (not shown) using characters or the like, for example.

The inboard tread edge (Tei) refers to one of the two tread edges which is intended to be positioned towards the center of the vehicle body. The outboard tread edge (Teo) refers to the other tread edge which is intended to be positioned away from the center of the vehicle body. According thereto, in this application, the terms "outboard" and "inboard" are used toward the outboard tread edge (Teo) and inboard tread edge (Tei), respectively, to refer relative positions in the tire axial direction.

The tread edges are the axial outermost edges of the ground contacting patch which occurs under a normally inflated loaded condition when the camber angle of the tire is zero.

The abovementioned normally inflated loaded condition is such that the tire is mounted on a standard wheel rim and inflated to a standard pressure and loaded with a standard tire load.

The standard wheel rim means a wheel rim officially approved or recommended for the tire by standards organizations, the standard wheel rim is the "standard rim" specified in JATMA, the "Measuring Rim" in ETRTO, the "Design Rim" in TRA or the like, for example.

The standard pressure means the "maximum air pressure" in JATMA, the "Inflation Pressure" in ETRTO, and the maximum pressure given in the "Tire Load Limits at various Cold Inflation Pressures" table in TRA or the like.

The standard load is the "maximum load capacity" in JATMA, the "Load Capacity" in ETRTO, and the maximum value given in the above-mentioned table in TRA or the like.

In case of passenger car tires, however, the standard pressure and standard tire load are uniformly defined by 180 kPa and 88% of the maximum tire load, respectively.

The tread width TW shown in FIG. 1 is the width measured under a normally inflated unloaded condition, as the axial distance between the tread edges Teo. Tei determined as above.

The normally inflated unloaded condition is such that the tire is mounted on the standard wheel rim and is inflate to the standard pressure but loaded with no tire load. In this application including specification and claims, various dimensions, positions and the like of the tire refer to those under the normally inflated unloaded condition of the tire unless otherwise noted.

The tire comprises a tread portion 2 with a tread pattern having an outboard tread portion 2A that is between the outboard tread edge (Teo) and a tire equator C, and an inboard tread portion 2B that is between the inboard tread edge (Tei) and the tire equator C.

The outboard tread portion 2A is provided with at least one circumferentially extending outer main groove 3A. In this embodiment, a first outer main groove 3a by the side of the outboard tread edge (Teo) and a second outer main groove 3b by the side of the tire equator C are provided in the outboard tread portion 2A. A plurality of middle lateral grooves 4 are also provided each of which connects between the first and second main grooves 3a, 3b in the outboard tread portion 2A.

The inboard tread portion 2B is provided with one circumferentially extending inner main groove 3B.

By providing such grooves, the tread portion 2 is separated into an outboard shoulder portion 5 between the first main groove 3a and the outboard tread edge (Teo), an outboard middle portion 6R including a plurality of middle blocks 6 between the first and second outer main grooves 3a, 3b, a center portion 7 between the second outer main groove 3b and the inner main groove 3B, and an inboard shoulder portion 8 between the inner main groove 3B and the inboard tread edge (Tei).

In order to effectively get traction on wet roads, each of main grooves 3a, 3b, 3B mentioned above straightly extends along the circumferential direction of the tire to drain the water under the tread portion 2 to backward. Additionally, such straight main grooves 3a, 3b, 3B maintain circumferential rigidity of each portion 5, 7 and 8 so that straight-line stability as well as wear resistance of the tire is improved.

Groove widths W1 of outer main grooves 3A and groove width W2 of the inner main groove 3B are not particularly limited. Preferably, groove widths W1, W2 mentioned above are in a range of not less than 4%, more preferably not less than 5%, but preferably not more than 10%, more preferably not more than 9% the tread width TW in order to improve drain performance, straight-line stability and wear resistance of the tire. Here, a groove width of a groove is measured as a distance between two groove edges on the tread contact surface 2n.

Preferably, the axial distance L1 between the first outer main groove 3a and the tire equator C is in a range of from 27% to 33% the tread width TW. Preferably, the axial distance L2 between the second outer main groove 3b and the tire equator C is in a range of from 8% to 14% the tread width TW. Preferably, the axial distance L3 between the inner main groove 3B and the tire equator C is in a range of from 10% to 16% the tread width TW. Thus, each land portions 5 to 8 is divided in well balanced. Here, each position of main grooves 3A, 3B is specified as its groove centerline. The groove centerline is defined as a centerline at the bottom of the groove.

Figure 2:
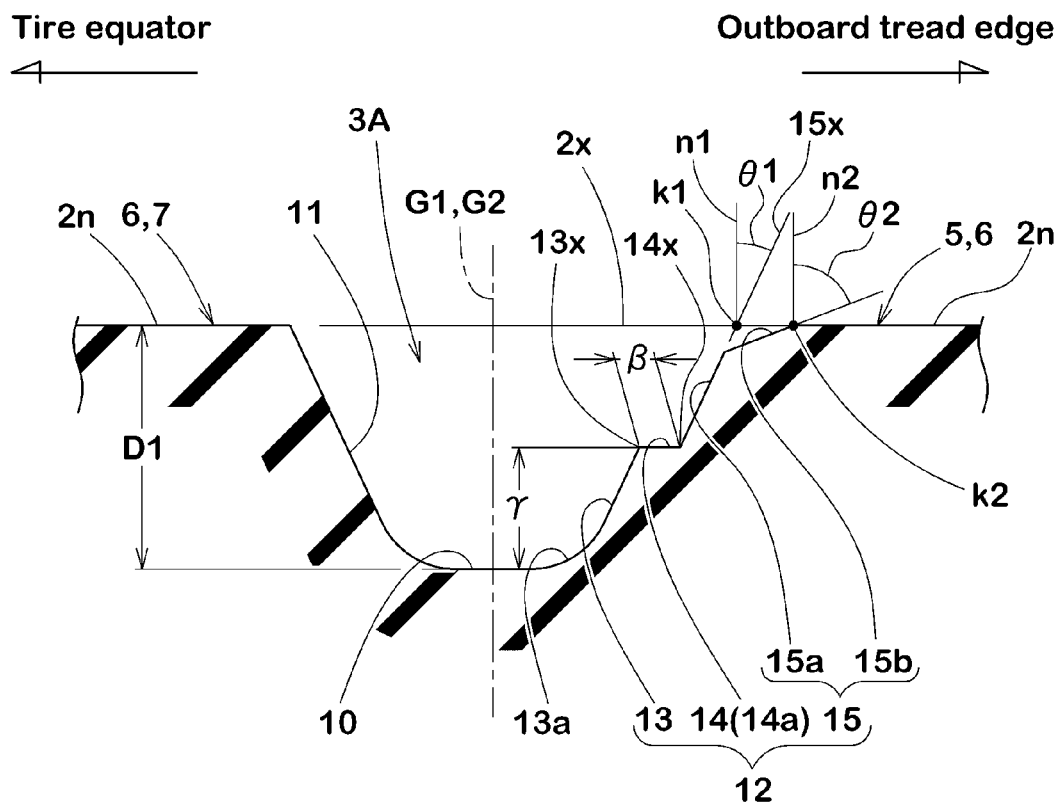
FIG. 2 is a cross sectional view taken along a line X-X in FIG. 1.

FIG. 2 shows a cross sectional view of the first outer main groove 3a taken along a line X-X in FIG. 1, as the representative example of the outer main groove 3A. Accordingly, the second outer main groove 3b also has the same cross section of FIG. 2. Referring to FIG. 2, the outer main groove 3A has the cross section that comprises a bottom 10 being radially innermost of the groove, an axially inner groove wall 11 which extends from the bottom 10 to a tread contact surface 2n, and an axially outer groove wall 12 which extends from the bottom 10 to the tread contact surface 2n.

The bottom 10 of the outer main groove 3A has a depth D1 in a range of from 5.5 to 6.5 mm. In case that the depth D1 is less than 5.5 mm, drain performance of the tire may deteriorate due to its less volume. In case that the depth D1 is more than 6.5 mm, straight-line stability, wear resistance, cornering performance or the noise performance of the tire may deteriorate due to its much volume. Preferably, the depth D1 is in a range of from 5.7 to 6.3 mm.

At least one of the groove walls 11, 12 has a stepwise shape. In this embodiment, the axially outer groove wall 12 has the stepwise shape which comprises a radially inner portion 13 extending from the bottom 10 toward radially outwardly of the tire with a height $\gamma$ in a range of from 2.0 to 4.0 mm, a stepped portion 14 extending from the radially outer end 13$x$ of the radially inner portion 13 with an axial length $\beta$ in a range of from 0.75 to 1.25 mm so as to expand its groove width, and a radially outer portion 15 extending from an axially outer end 14$x$ of the stepped portion 14 to the tread contact surface 2n.

Such the outer groove wall 12 having the stepwise shape enhances lateral rigidity of the outboard shoulder and middle portions 5 and 6, whereby improves cornering and drainage performance of the tire. Especially, since the stepped portion 14 helps to increase its groove volume and surface area, drainage performance is effectively improved while reducing pipe resonance generated therein.

Since the radially inner portion 13 and the stepped portion 14 have the specified height $\gamma$ and length $\beta$ mentioned above, rigidity of the outboard middle and shoulder portion 6, 5 is enhanced so that straight-line stability of the tire is improved. Therefore, the tire 1 in accordance with the present invention improves drainage performance, cornering stability on dry roads, noise performance and straight-line stability in well-balanced.

In case that the height $\gamma$ of the radially inner portion 13 is less than 2.0 mm, rigidity of the outboard shoulder and middle portions 5, 6 that are connected with the outer groove wall 12 reduce. In case that the height $\gamma$ of the radially inner portion 13 is more than 4.0 mm, volume of outer main grooves 3a and 3b tend to be small. Preferably, the height $\gamma$ of the inner portion 13 is in a range of not less than 2.5 mm, but less than 3.5 mm.

The radially inner portion 13 comprises an arc portion 13$a$ which protrudes toward outside the groove and is smoothly connected with the bottom 10. Such a radially inner portion 13 enhances the corner between the outer groove wall 12 and the bottom 10 so that straight-line stability, cornering performance and wear resistance of the tire are improved.

In case that the length $\beta$ of the stepped portion 14 is less than 0.75 mm, the advantage that prevents pipe resonance generated in the outer main groove 3A may not be obtained sufficiently. In case that the length $\beta$ of the stepped portion 14 is more than 1.25 mm, the tread contact surface 2n on the outboard shoulder and middle portions 6, 5 is decreased, whereby may deteriorate braking performance, for example. Preferably, the length β is in a range of from 0.80 to 1.20 mm.

The stepped portion 14 in this embodiment comprises a flat surface 14a which straightly extends along the axial direction of the tire in order to maintain both lateral rigidity of the outboard shoulder and middle portions 6, 5 and its groove volume.

The radially outer portion 15 in accordance with the present embodiment comprises a steep slope portion 15a which straightly extends from the axially outer end 14x of the stepped portion 14 to radially outwardly of the tire and a gentle slope portion 15b having a low angle compared with the steep slope portion 15a which straightly extends between the steep slope portion 15a and the tread contact surface 2n. Such an outer portion 15 may improve wear resistance of the tread portion 2 by reducing contact pressure at its radially outer groove edge k2. Lateral rigidity of the outboard shoulder and middle portions 5, 6 may be also enhanced due to sufficiently rubber volume given from the outer portion 15.

In order to further improve advantage mentioned above, the angle θ1 of the steep slope portion 15a is preferably in a range of from 10 to 30 degrees. Similarly, the angle θ2 of the gentle slope portion 15b is preferably in a range of from 55 to 75 degrees. Here, each of the angles θ1 and θ2 is measured as an angle with respect to the tire normal line n1 or n2 each of which passes through the point k1 or k2. The point k2 is an intersection between the tread contact surface 2n and the gentle slope portion 15b. The point k1 is an intersection between the imaginary tread contact surface 2x and the expanded line 15x of the steep slope portion 15a.

The inner groove wall 11 in accordance with the present embodiment smoothly extends from the bottom 10 to the tread contact surface 2n so as to expand the groove width toward radially outwardly of the tire without having a stepped portion. Thus, the inner groove wall 11 helps to improve lateral rigidity of the center portion 7 or the outboard middle portion 6 as well as wear resistance thereof. Additionally, since the inner wall portion 11 maintains its shape so as to obtain sufficiently groove volume when a tire load is loaded, drainage performance is also improved. Therefore, the tire 1 having the outer main groove 3A comprising the stepped outer groove wall 12 and the non-stepped inner groove wall 11 in accordance with the present embodiment decreases deformation of the outer main groove 3A during straight traveling ahead and cornering to obtain sufficiently ground contact area of the tread portion 2. Thus, the tire improves straight-line stability, cornering performance, drainage performance and wear resistance in well-balanced.

Figure 3:
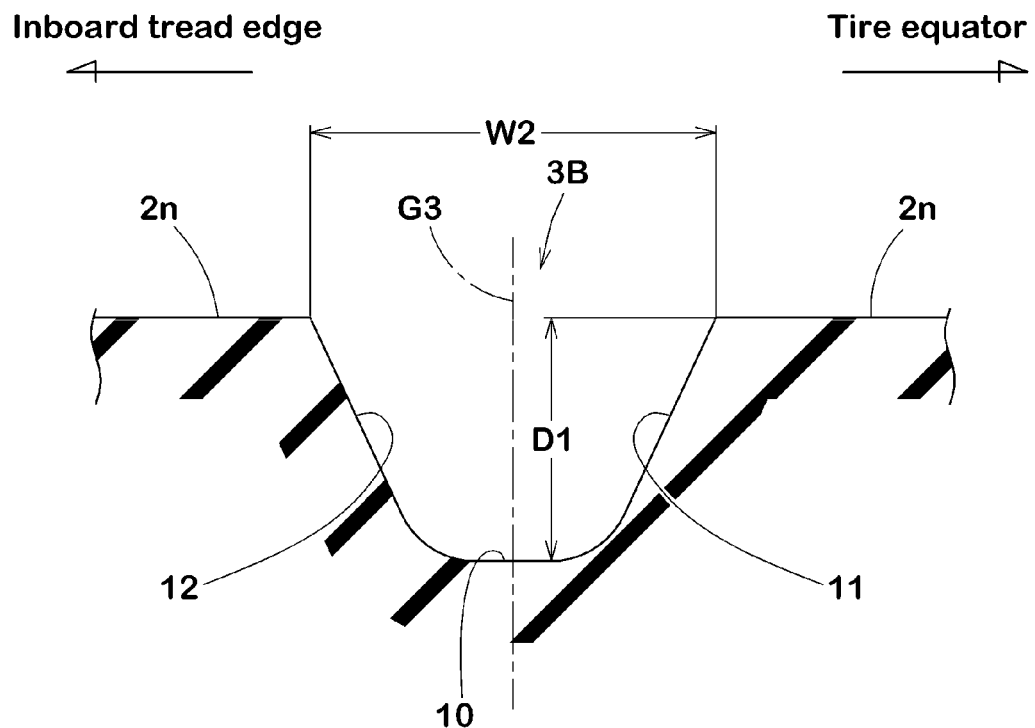
FIG. 3 is a cross sectional view taken along a line Y-Y in FIG. 1.

FIG. 3 shows a cross sectional view of the inner main groove 3B taken along a line Y-Y in FIG. 1 which is perpendicular to the groove centerline G3 thereof. Referring to FIG. 3, the inner main groove 3B comprises a bottom 10 and a pair of groove walls 11, 12 smoothly extending to the tread contact surface 2n from the bottom 10 with an inclination so that its groove width expands toward radially outward of the tire. Namely, each of groove walls 11, 12 has no stepped portion therein. At least one of the groove walls 11, 12, however, may include a stepped portion in the same way as the outer groove wall 12 of the outer main groove 3A.

Referring to FIG. 1, each middle lateral groove 4 is inclined in the same direction that is upward to the right in the embodiment. Preferably, each middle lateral groove 4 is smoothly curved to protrude toward a direction, in order to drain the water under the middle blocks 6 toward the first and second outer main grooves 3a, 3b.

In order to maintain lateral rigidity of outer middle blocks 6 while improving drainage performance of tire, each middle lateral groove 4 has an angle α1 in a range of not less than 4 degrees, more preferably not less than 5 degrees, but preferably not more than 14 degrees, more preferably not more than 12 degrees with respect to the axial direction of the tire.

In order to maintain lateral rigidity of outer middle blocks 6 while improving drainage performance of tire, each middle lateral groove 4 preferably has a groove width W4 in a range of not less than 2.0 mm, more preferably not less than 3.5 mm, but preferably not more than 11.0 mm, more preferably not more than 9.5 mm. In the same point of view, each middle lateral groove 4 preferably has a groove depth in a range of not less than 0.8 mm, more preferably not less than 1.0 mm, but preferably not more than 5.0 mm, more preferably not more than 4.5 mm.

Each outer middle block 6 is provided with an outer middle lug groove 17 that extends from the first outer main groove 3a toward the tire equator C without reaching the second outer main groove 3b. Since the outer middle block 6 has an axially inner portion with high rigidity, straight-line stability, braking performance and wear resistance of the tire may be improved. The axial length L9 of the lug groove 17 is preferably in a range of 25% to 35% of the axial length L5 of the outer middle block 6.

In order to further improve advantage mentioned above, the groove width W6 of the outer middle lug groove 17 is preferably in a range of from 1.0 to 6.5 mm, and the groove depth (not shown) thereof is in a range of from 1.0 to 4.5 mm.

The outer shoulder portion 5 is provided with a plurality of outer shoulder lug grooves 16 each of which extends from the outboard tread edge Teo toward the tire equator C without reaching the first outer main groove 3a to form a circumferentially extending rib. Such the outer shoulder portion 5 helps to improve drainage performance without reducing its rigidity.

In order to further improve advantage mentioned above, the axial length L8 of the outer shoulder lug groove 16 is preferably in a range of 65% to 95% of the axial length L4 of the outer shoulder portion 5. Additionally, the groove width W5 of the outer shoulder lug groove 16 is preferably in a range of from 8% to 18% of the axial length L4 of the outer shoulder portion 5, and the groove depth (not shown) thereof is in a range of from 1.0 to 5.0 mm.

The center portion 7 is provided with a center narrow groove 21 that circumferentially and continuously extends on the tire equator C in a straight manner so that the film of the water on the road is quickly dispersed and drained backwardly. Preferably, the center narrow groove 21 has a groove width W7 in a range of from 2.0 to 12.0 mm, and a groove depth (not shown) in a range of from 2.5 to 4.5 mm.

The center portion 7 is also provided with a plurality of center lug grooves 22 that extend from both ends of the center portion 7 toward the tire equator C without reaching the center groove 21. Axial lengths L10 of center lug grooves 22 are preferably in a range of from 8% to 22% the axial length L6 of the center portion 7, in order to maintain rigidity of the center portion 7 so that straight-line stability, braking performance and wear resistance of the tire are improved. Preferably, groove widths W8 of center lug grooves 22 are in a range of from 2.0 to 8.0 mm, and groove depths (not shown) are in a range of from 2.5 to 4.5 mm.

The inner shoulder portion 8 is provided with a plurality of first inner lug grooves 26 each of which extends from the inboard tread edge Tei toward the tire equator C without reaching the inner main groove 3B. The inner shoulder portion 8 is also provided with a plurality of second inner lug grooves 27 each of which arranged in between adjacent first inner lug groove 26, 26 and extends from the inboard tread edge Tei toward the tire equator C having an axial length L13 smaller than that of the first inner lug groove 27. Namely, the inner shoulder portion 8 is formed as a continuously extending rib that helps to maintain its rigidity while improving drainage performance.

Preferably, the first inner lug groove 26 has an axial length L12 in a range of from 88% to 96% of an axial length L7 of the inner shoulder portion 8, a groove width W9 in a range of 2.5 to 8.5 mm, and a groove depth in a range of from 1.0 to 5.0 mm. Similarly, the second inner lug groove 27 preferably has an axial length L13 in a range of from 18% to 26% of the axial length L7 the inner shoulder portion 8, a groove width W10 in a range of 1.0 to 7.0 mm, and a groove depth in a range of from 1.0 to 5.0 mm.

The inboard shoulder portion 8 is also provided with at least one heat radiation groove 28 provided between adjacent first inner lug grooves 26, 26. The heat radiation groove 28 for heat radiation has both ends that terminate without reaching any other grooves. The groove 28 is arranged axially inward the second inner lug groove 27 in order to maintain rigidity of the inner shoulder portion 8. Preferably, the groove 28 is located in a middle region between the axially inner end of the second inner lug groove 27 and the inner main groove 38.

Figure 4:
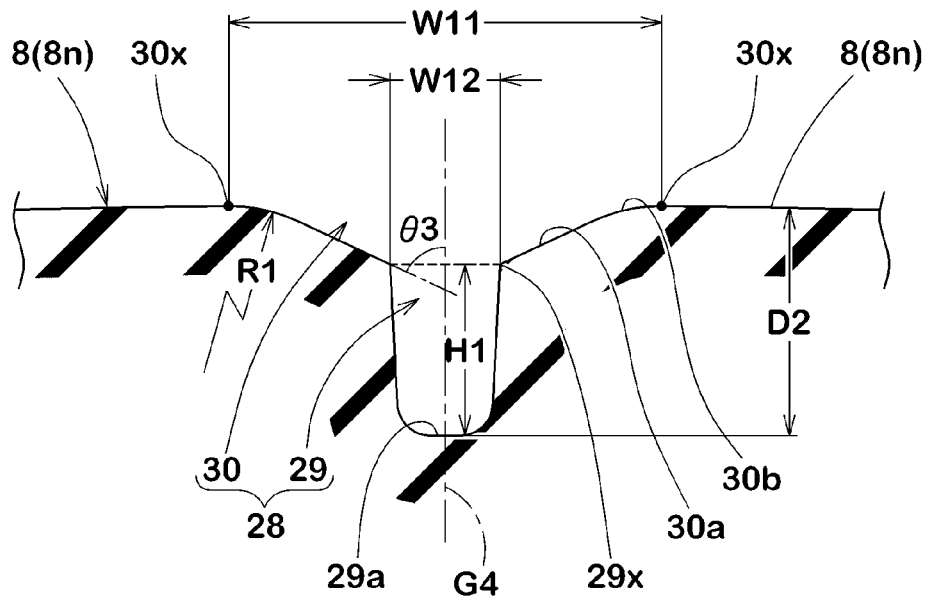
FIG. 4 is a cross sectional view taken along a line Z-Z in FIG. 1.

FIG. 4 shows a cross sectional view of the groove 28 taken along a line Z-Z in FIG. 1 that is perpendicular to its groove centerline G4. Referring to FIG. 4, the groove 28 has a groove depth D2 in a range of from 3.0 to 5.0 mm to improve drainage performance so that the film of water on the road is quickly dispersed.

The heat radiation groove 28 has a cross section that comprises a radially inner part 29 and a radially outer part 30. The inner part 29 in accordance with the present embodiment has an U-shaped cross section having a height H1 from its bottom 29a in order to maintain rigidity of the inner shoulder portion 8. The height H1 of the inner part 29 is preferably in a range of from 60% to 80% of the depth D2 of the groove 28 to maintain its rigidity while improving drainage performance in well-balanced.

The outer part 30 comprises a pair of slant surfaces 30a each of which extends from the radially outer end 29x of the inner part 29 having an inclination so that its groove width increases to the radially outward of the tire. Such a slant surface 30a helps to radiate heat from the tire by increasing its surface area. Preferably, each slant surface 30a is smoothly connected with the tread contact surface 8n of the inner shoulder portion 8 through a chamfer portion 30b for maintaining rigidity of the inner shoulder portion 8.

In order to improve advantage mentioned above, an angle θ3 of the slant surface 30a with respect to a groove width direction is preferably in a range of from 5 to 40 degrees. Preferably, the radius of curvature R1 of the chamfer portion 30b is preferably in a range of from 5 to 15 mm. Preferably, the groove 28 for heat radiation has a groove width W11 that is an axial distance between radially outer ends 30x, 30x of the chamfer portion 30b is in a range of from 7.0 to 13.0 mm. Preferably, the inner part 29 has a groove width W12 in a range of from 1.0 to 3.0 mm.

Figure 5:
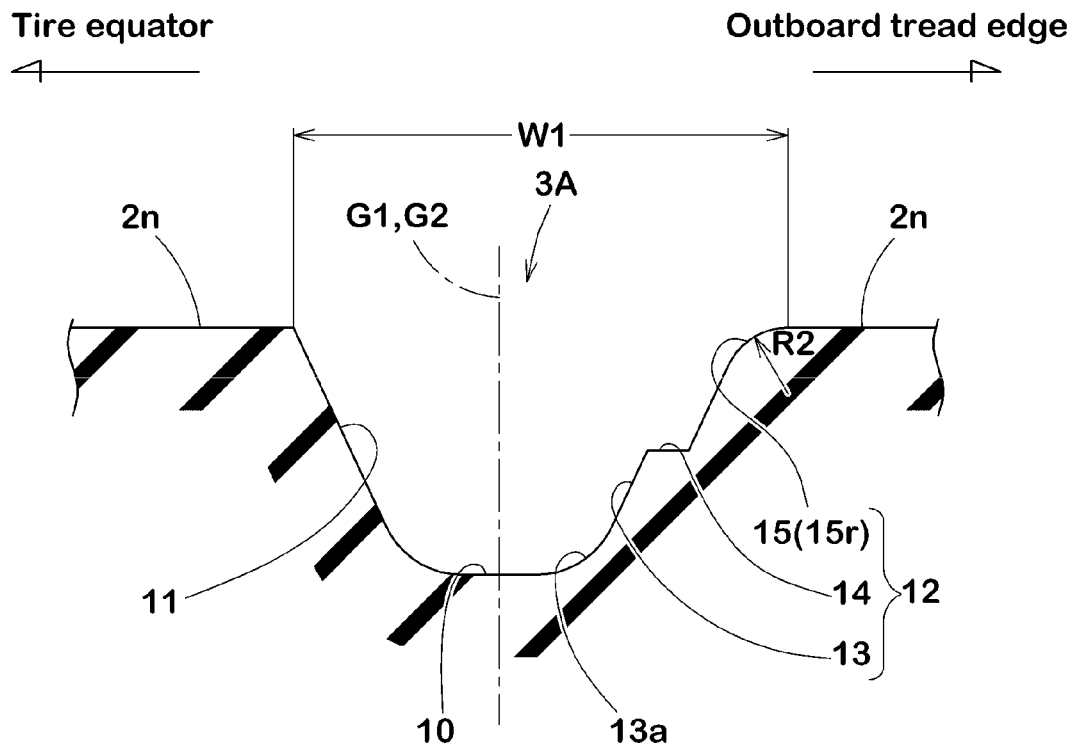
FIG. 5 is a cross sectional view of another embodiment of an outer main groove.

FIG. 5 shows a cross sectional view of another embodiment of an outer main groove 3A. Referring to FIG. 5, the outer main groove 3A has the radially outer portion 15 formed in a curved shape including an arc 15r that protrudes toward its groove centerline G1, G2 and is smoothly connected with the tread contact surface 2n. Since tread contact pressure around the outer portion of the tread contact surface 2n tends to decrease, wear resistance thereof improves. Preferably, the arc 15r has a radius R2 of curvature is in a range of from 5 to 15 mm, in order to maintain both straight-line stability and cornering performance while improving wear resistance of the tread portion.

Although the present invention has been described so far in detail, the present invention is not limited to the specific embodiments described above and may be changed to different aspects as needed. Additionally, the present invention is more specifically described and explained by means of the following Examples and References. Note that the present invention is not limited to these Examples.

Comparison Test

Pneumatic tires having a tire size of 255/40ZRF20 with s basic tread pattern of FIG. 1 except for details shown in Table 1 were made and tested with respect to: drainage performance; driving performance; wear resistance; and noise performance. The main specification of tires and test methods are as follows.

Tread width TW: 215 mm

Middle lateral groove depth: 1.3 to 4.3 mm

Lug groove depth: 2.0 to 3.5 mm

Center narrow groove depth: 3.5 mm

Heat radiation groove depth D3: 4.0 mm

Drainage Performance:

The test tires were installed in a vehicle with four-wheel drive with a displacement of 3,800 cc as four wheels under the following condition. Then, the test car was run ten laps in a wet asphalt test course of 3000 meters overall with 2 to 5 mm depth of water, and was measured the best lap time. The results are indicated the reciprocal number of the lap time by an index based on Ref.3 being 100. The larger the value, the better the performance is.

Rim size: 20×9.5J

Internal pressure: 200 kPa (Front)

Tire load: 4.6 kN (Front)

Outer main groove cross section: FIG. 2

Steep slant portion angle θ1: 20 degrees

Gentle slant portion angle θ2: 65 degrees

Driving Performance:

The test vehicle mentioned above was run on a dry asphalt test course, and evaluated with respect to straight-line stability, steering response, cornering performance and braking performance based on the driver's feeling. The results are indicated by a score based on Ref.3 being 100. The larger the value, the better the performance is.

Wear Resistance:

The test vehicle mentioned above was run for 8,000 km on roads that include 50% speedway, 35% ordinary road and 15% mountain road, and then groove depths of the first and second outer main grooves were measured at evenly eight places in the circumferential direction of the tire, respectively. The average groove depth in each tire was evaluated. The results are indicated by an index based on Ref.3 being 100. The larger the value, the better the performance is.

Noise Performance:

The test vehicle mentioned above was run at a speed of 50 km/h on a noise measurement road with rough asphalt surface, and in-vehicle noise was picked up through a microphone installed near the driver's ear on the window side, and then a sound pressure level of a peak value was measured. Test result of each tire is shown reciprocal number of the peak value with an index of 100 representing a value in Ref.3. The larger the value, the better the performance is.

Table 1 shows the test results.

TABLE 1

|  | Ref. 1 | Ref. 2 | Ref. 3 | Ref. 4 | Ref. 5 | Ref. 6 | Ex. 1 | Ex. 2 | Ex. 3 | Ref. 7 | Ref. 8 | Ex. 4 | Ex. 5 | Ref. 9 |
|---|---|---|---|---|---|---|---|---|---|---|---|---|---|---|
| Main groove depth D1 (mm) | 5 | 5.5 | 6 | 6.5 | 7 | 6 | 6 | 6 | 6 | 6 | 6 | 6 | 6 | 6 |
| Stepped portion length β (mm) | — | — | — | — | — | 0.5 | 0.75 | 1 | 1.25 | 1.5 | 1 | 1 | 1 | 1 |
| Inner portion height γ (mm) | — | — | — | — | — | 3 | 3 | 3 | 3 | 3 | 1 | 2 | 4 | 5 |
| Straight-line stability [Score] | 100 | 100 | 100 | 100 | 100 | 99 | 101 | 102 | 102 | 102 | 100 | 102 | 102 | 101 |
| Steering response [Score] | 100 | 100 | 100 | 100 | 100 | 100 | 101 | 102 | 102 | 102 | 100 | 102 | 102 | 101 |
| Drainage performance [Index] | 98 | 99 | 100 | 101 | 102 | 101 | 101 | 101 | 100 | 98 | 99 | 101 | 100 | 99 |
| Cornering performance [Score] | 101 | 101 | 100 | 100 | 99 | 101 | 101 | 101 | 101 | 101 | 99 | 101 | 101 | 101 |
| Braking performance [Score] | 100 | 100 | 100 | 100 | 100 | 100 | 100 | 100 | 100 | 100 | 100 | 100 | 100 | 100 |
| Wear resistance [Index] | 99 | 100 | 100 | 100 | 101 | 100 | 100 | 100 | 100 | 100 | 100 | 100 | 100 | 100 |
| Noise performance [Index] | 102 | 101 | 100 | 99 | 98 | 101 | 102 | 102 | 102 | 100 | 100 | 101 | 102 | 101 |

From the test results, it was confirmed that tires in accordance with the present invention can be effectively improved drainage performance, cornering stability, and straight-line stability.

The invention claimed:

1. A pneumatic tire comprising a tread portion comprising an asymmetric tread pattern with a designated install direction to a vehicle, wherein
the tread portion comprises an outboard tread portion that is positioned outward with respect to the tire equator when the tire is installed to a vehicle and an inboard tread portion that is positioned inward with respect to the tire equator when the tire is installed to the vehicle,
said outboard tread portion is provided with at least one circumferentially extending outer main groove to form an outboard shoulder portion between the outer main groove and an outboard tread edge,
said outer main groove, in a cross section perpendicular to the groove centerline, comprises
a bottom having a depth in a range of from 5.5 to 6.5 mm,
an axially inner groove wall which extends from the side of the tire equator of the bottom to a tread contact surface, and an axially outer groove wall which extends from the side of a tread contacting edge of the bottom to the tread contact surface,
at least one of said groove walls has a stepwise shape that comprises a radially inner portion extending radially outward from the bottom with a height γ in a range of from 2.0 to 4.0 mm, a stepped portion extending from a radially outer end of said radially inner portion in an axial direction of the tire with a length β in a range of from 0.75 to 1.25 mm, and
a radially outer portion extending from an axially outer end of the stepped portion to the tread contact surface,
said inboard tread portion is provided with one circumferentially extending inner main groove so as to form an inboard shoulder portion that is between an inboard tread edge and the inner main groove,
said inboard shoulder portion is provided with a heat radiation groove,
said heat radiation groove has a depth in a range of from 3.0 to 5.0 mm and comprises a radially inner part having a radial height in a range of from 60% to 80% in respect to a groove depth from the bottom in the cross section perpendicular to the groove centerline and a radially outer part connecting to the radially inner part and extending toward the tread contact surface,
said radially inner part has a groove width in a range of 1.0 to 3.0 mm,
said radially outer part comprises a pair of slant groove walls so that a groove width thereof is increasing,
the inboard shoulder portion is further provided with a plurality of first inner lug grooves each of which extends from the inboard tread edge toward the tire equator beyond the heat radiation groove without reaching the inner main groove.
the outboard shoulder portion is provided with a plurality of outer shoulder lug grooves each of which extends from the outboard tread edge toward the tire equator without reaching the outer main groove, wherein axial lengths of the outer shoulder lug grooves are in a range of from 65% to 95% of an axial length of the outer shoulder portion, and
circumferential pitches of the outer shoulder lug grooves are smaller than circumferential pitches of the first inner lug grooves.

2. The tire according to claim 1, wherein said axially outer groove wall has said stepwise shape.

3. The tire according to claim 2, wherein said radially outer portion has an arc shape which protrudes toward a groove centerline in a cross section of said outer main groove.

4. The tire according to claim 2, wherein said axially inner groove wall has a slant shape which smoothly extends from the bottom to the tread contact surface so as to expand the groove width.

5. The tire according to claim 2, wherein
said at least one outer main groove comprises a first outer main groove by the side of said outboard tread edge and a second outer main groove by the side of the tire equator, and
each of said first and second outer main groove walls has the axially outer groove wall having said stepwise shape.

6. The tire according to claim 2, wherein
the inboard shoulder portion is provided with a plurality of first inner lug grooves each of which extends from the inboard tread edge toward the tire equator without reaching the inner main groove, and said heat radiation groove has both ends that terminate within said the inboard shoulder portion without reaching any other groove.

7. The tire according to claim 2, wherein said inboard shoulder portion is a rib continuously extending in the circumferential direction of the tire.

8. The tire according to claim 2, wherein said heat radiation groove extends in the circumferential direction of the tire.

9. The tire according to claim 2, wherein said inboard shoulder portion is provided with a second inner lug groove arranged between circumferentially adjacent first inner lug grooves and extends from the inboard tread edge toward the tire equator having an axial length smaller than that of the first inner lug groove, and said heat radiation groove is located between the axially inner end of the second inner lug groove and the inner main groove.

10. The tire according to claim 1, wherein said radially outer portion has an arc shape which protrudes toward a groove centerline in a cross section of said outer main groove.

11. The tire according to claim 10, wherein said axially inner groove wall has a slant shape which smoothly extends from the bottom to the tread contact surface so as to expand the groove width.

12. The tire according to claim 10, wherein
said at least one outer main groove comprises a first outer main groove by the side of said outboard tread edge and a second outer main groove by the side of the tire equator, and
each of said first and second outer main groove walls has the axially outer groove wall having said stepwise shape.

13. The tire according to claim 10, wherein
the inboard shoulder portion is provided w:ith a plurality of first inner lug grooves each of which extends from the inboard tread edge toward the tire equator without reaching the inner main groove, and
said heat radiation groove has both ends that terminate within said the in board shoulder portion without reaching any other groove.

14. The tire according to claim 10, wherein said inboard shoulder portion is a rib continuously extending in the circumferential direction of the tire.

15. The tire according to claim 1, wherein said axially inner groove wall has a slant shape which smoothly extends from the bottom to the tread contact surface so as to expand the groove width.

16. The tire according to claim 1, wherein
said at least one outer main groove comprises a first outer main groove by the side of said outboard tread edge and a second outer main groove by the side of the tire equator, and
each of said first and second outer main groove walls has the axially outer groove wall having said stepwise shape.

17. The tire according to claim 1, wherein said inboard shoulder portion is a rib continuously extending in the circumferential direction of the tire.

18. The tire according to claim 1, wherein said heat radiation groove extends in the circumferential direction of the tire.

19. The tire according to claim 1, wherein
said inboard shoulder portion is provided with a second inner lug groove arranged between circumferentially adjacent first inner lug grooves and extends from the inboard tread edge toward the tire equator having an axial length smaller than that of the first inner lug groove, and said heat radiation groove is located between the axially inner end of the second inner lug groove and the inner main groove.

* * * * *